United States Patent
Lin

(10) Patent No.: US 9,057,847 B2
(45) Date of Patent: Jun. 16, 2015

(54) MALE OPTICAL CONNECTOR AND FEMALE OPTICAL CONNECTOR AND RELATED OPTICAL FIBER COUPLING ASSEMBLY

(75) Inventor: I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 228 days.

(21) Appl. No.: 13/596,040

(22) Filed: Aug. 27, 2012

(65) Prior Publication Data
US 2013/0308907 A1 Nov. 21, 2013

(30) Foreign Application Priority Data

May 16, 2012 (TW) .............................. 101117297 A

(51) Int. Cl.
*G02B 6/38* (2006.01)
*G02B 6/32* (2006.01)

(52) U.S. Cl.
CPC . *G02B 6/383* (2013.01); *G02B 6/32* (2013.01); *G02B 6/3849* (2013.01); *G02B 6/3885* (2013.01)

(58) Field of Classification Search
CPC ........ G02B 6/32; G02B 6/383; G02B 6/3849; G02B 6/3885

USPC .......................... 385/58, 59, 70, 71, 74, 77–79
See application file for complete search history.

(56) References Cited

U.S. PATENT DOCUMENTS

| | | | | |
|---|---|---|---|---|
| 5,241,612 A * | 8/1993 | Iwama | ............................. | 385/74 |
| 5,708,745 A * | 1/1998 | Yamaji et al. | .................... | 385/92 |
| 6,039,585 A * | 3/2000 | Kim et al. | ...................... | 439/137 |
| 6,655,850 B2 * | 12/2003 | Mann et al. | ...................... | 385/74 |
| 7,775,725 B2 * | 8/2010 | Grinderslev | ...................... | 385/74 |
| 7,985,026 B1 * | 7/2011 | Lin et al. | .......................... | 385/71 |
| 8,613,561 B2 * | 12/2013 | Ko et al. | .......................... | 385/93 |
| 8,858,094 B2 * | 10/2014 | Weinrotter et al. | .............. | 385/88 |

* cited by examiner

*Primary Examiner* — Daniel Petkovsek
(74) *Attorney, Agent, or Firm* — Novak Druce Connolly Bove + Quigg LLP

(57) ABSTRACT

A male optical connector includes a connector body, a hollow pusher, a number of lenses, and two elastic shielding plates. The connector body defines a receiving hole with an opening and includes a connection surface in the receiving hole. The connection surface faces the opening. The pusher extends from the connector body and surrounds the receiving hole. The lenses are received in the receiving hole. The two elastic shielding plates have two fixed ends fixed to opposite sides of the pusher, and opposite free ends overlappable to cover the opening.

10 Claims, 5 Drawing Sheets

MALE OPTICAL CONNECTOR AND FEMALE OPTICAL CONNECTOR AND RELATED OPTICAL FIBER COUPLING ASSEMBLY

BACKGROUND

1. Technical Field

The present disclosure relates to optical technology and, particularly, to a male optical connector, a female optical connector, and a related optical fiber coupling assembly.

2. Description of Related Art

Optical fiber coupling assemblies are preferred for use in data transmission between electronic devices due to their high transmission speed and signal integrity. The optical fiber coupling assembly includes two optical fiber connectors, such as a male optical connector and a female optical connector, for coupling the optical fibers together to allow optical transmittance between the optical fibers. The connectors include lenses each being aligned with a corresponding optical fiber. When coupling the two connectors together, a lens in the male optical connector is aligned with a corresponding lens in the female optical connector to ensure the optical transmittance. However, when the connector is detached from the other connector, the lenses are easily contaminated. This decreases transmission efficiency and destroys the signal integrity.

Therefore, it is desirable to provide a male optical connector, a female optical connector, and a related optical fiber coupling assembly, which can overcome or at least alleviate the limitations described.

DETAILED DESCRIPTION

Figure 1:
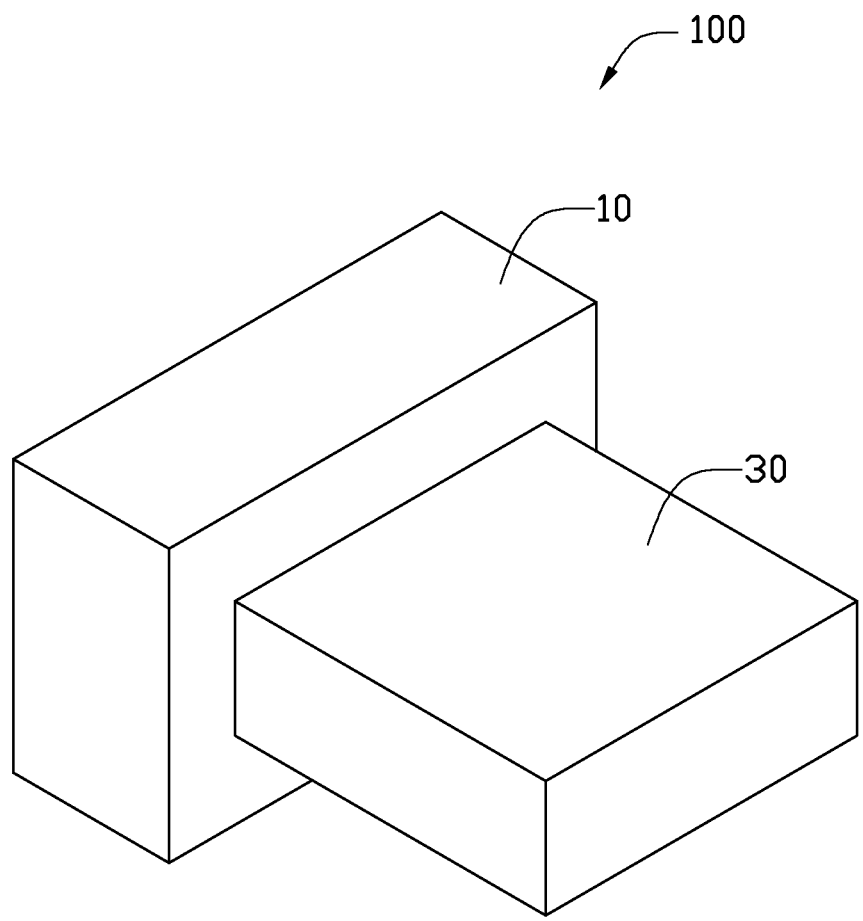
FIG. 1 is a schematic, isometric view of an optical fiber coupling assembly, according to an exemplary embodiment, showing the optical fiber coupling assembly in a coupled stated.

Referring to FIG. 1, an optical fiber coupling assembly 100, according to an exemplary embodiment, is shown. The optical fiber coupling assembly 100 includes a female optical connector 10 and a male optical connector 30. For example, the female optical connector 10 may be assembled in electronic devices (not shown), such as printers, cameras, and computer hosts. The male optical connector 30 may be assembled in some portable electronic devices or computer peripherals and is coupled with the female optical connector 10 for transmitting optical signals.

Figure 2:
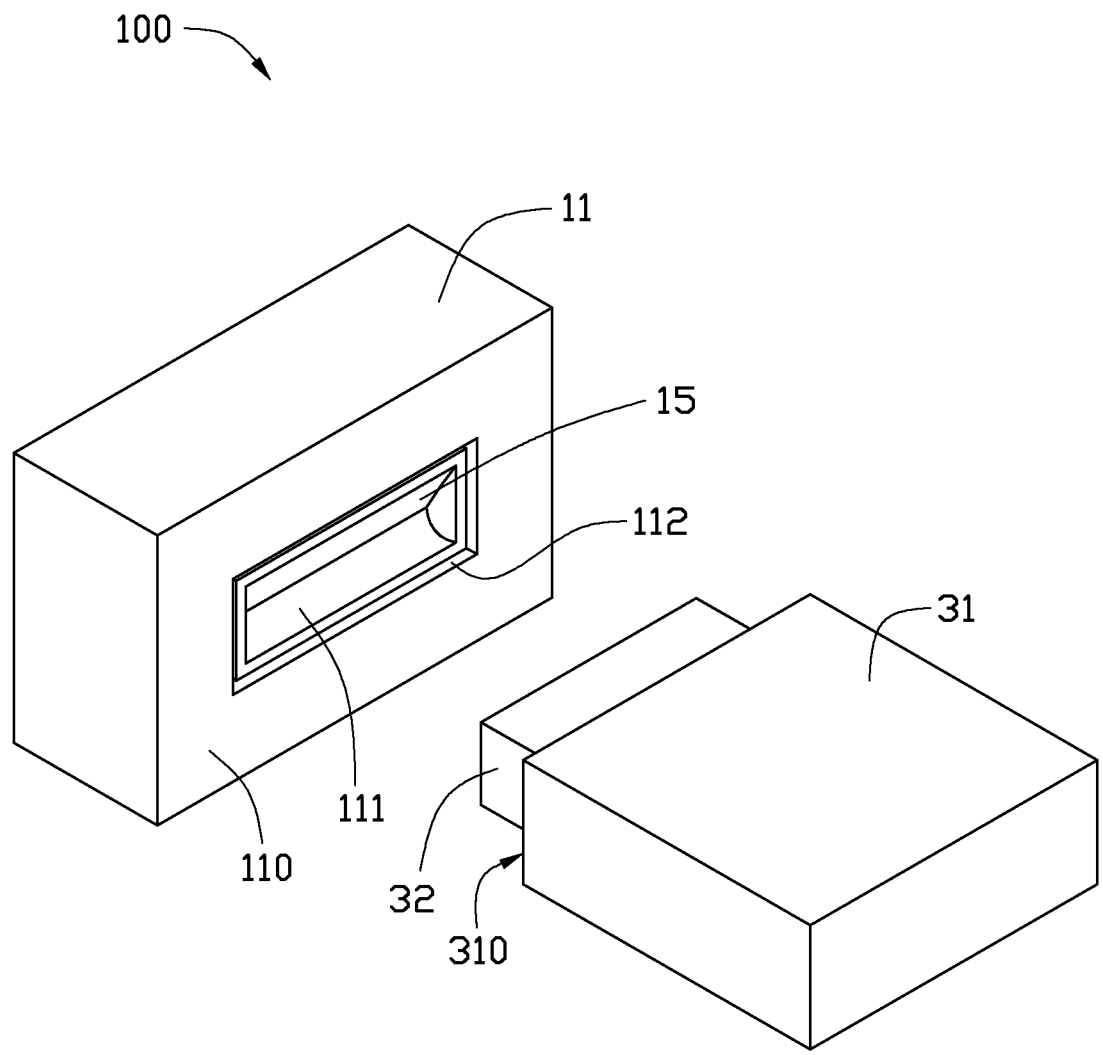
FIG. 2 is similar to FIG. 1, but showing the optical fiber coupling assembly in an uncoupled stated.
Figure 3:
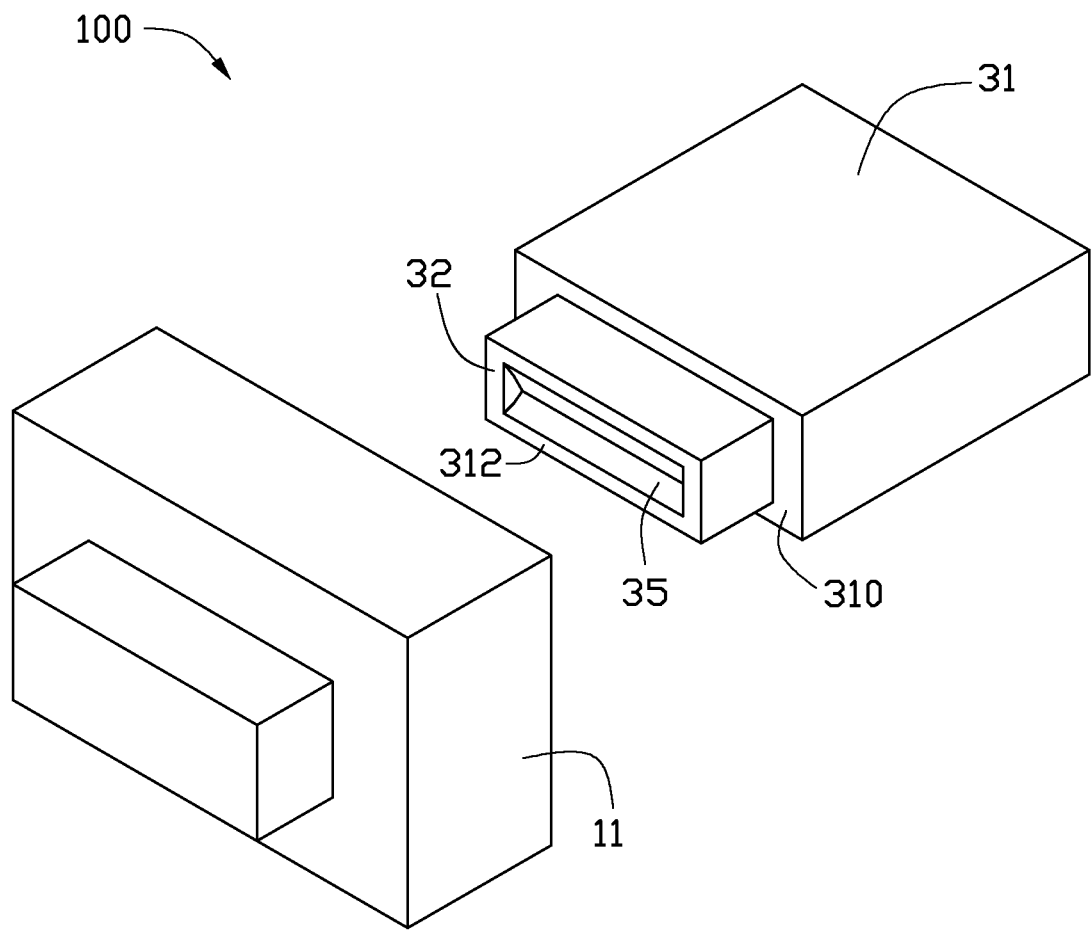
FIG. 3 is similar to FIG. 2, but viewed from another angle.
Figure 4:
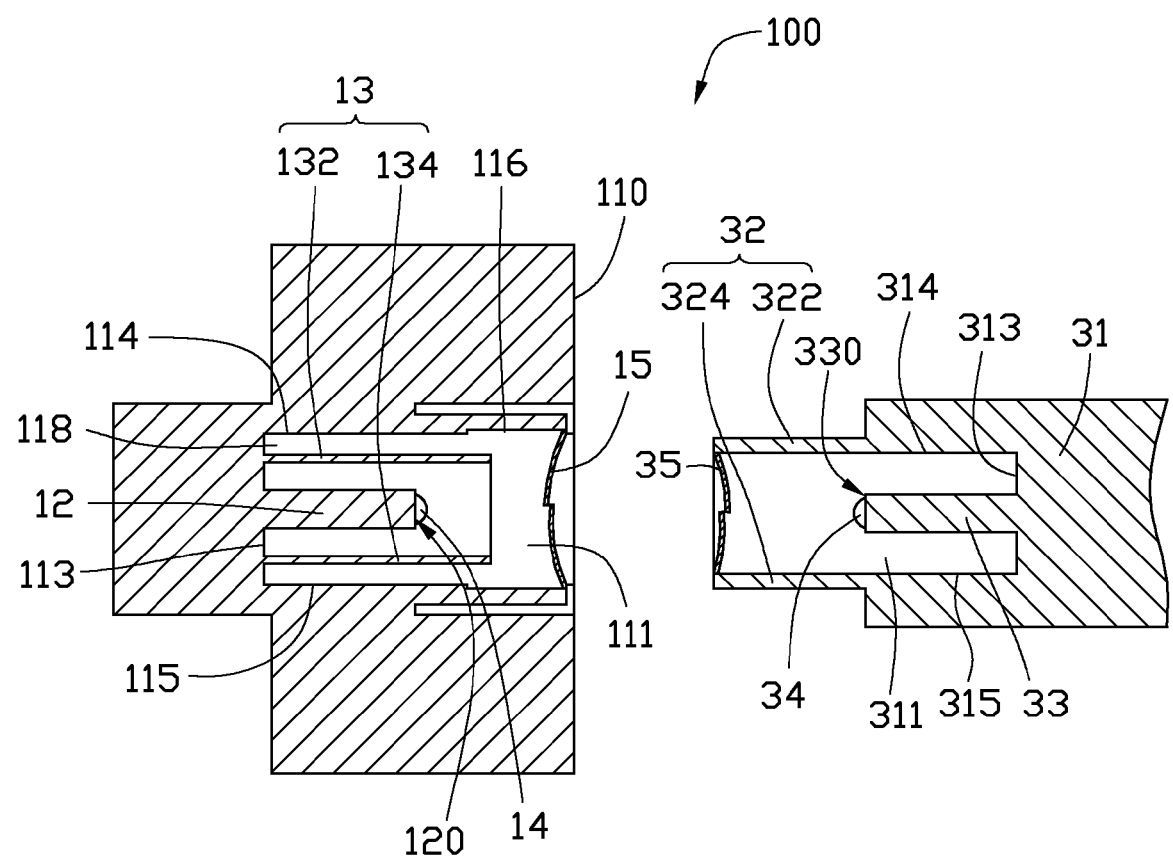
FIG. 4 is a cross sectional view of the optical fiber coupling assembly of FIG. 1, showing the optical fiber coupling assembly in an uncoupled stated.

Referring to FIGS. 2-4, the female optical connector 10 includes a first connector body 11, a first support platform 12, a first hollow pusher 13, two first lenses 14, and two first shielding plates 15.

The first connector body 11 includes a first coupling surface 110 facing the male optical connector 30. The first coupling surface 110 defines a first receiving hole 111 with a first opening 112. The first receiving hole 111 is rectangular and blind. The first connector body 11 includes a bottom surface 113, a first surface 114, and a second surface 115 in the first receiving hole 111. The first surface 114 is substantially parallel to the second surface 115. The bottom surface 113 perpendicularly interconnects the first surface 114 and the second surface 115. Two recesses 116 are respectively defined in the first surface 114 and the second surface 115. The recesses 116 are positioned at a distal portion of the first receiving hole 111 away from the bottom surface 113.

The first support platform 12 is a cube and extends from the bottom surface 113. The first support platform 12 includes a first light receiving surface 120 at a distal portion thereof. The first light receiving surface 120 is substantially parallel to the bottom surface 113.

The first hollow pusher 13 is a rectangular frame and is received in the first receiving hole 111. The first hollow pusher 13 extends from the bottom surface 113 and receives the first support platform 12. The first hollow pusher 13 includes a top wall 132 and a bottom wall 134 substantially parallel to the top wall 132. The top wall 132 is adjacent to the first surface 114. The bottom wall 134 is adjacent to the second surface 115. A receiving room 118 is formed between the first hollow pusher 13 and the first and second surfaces 114, 115.

The first lenses 14 are received in the first hollow pusher 13 and partially arranged on the first light receiving surface 120.

The first shielding plates 15 are made of elastic material, such as plastic, rubber, and metal sheet. Each first shielding plate 15 includes a first fixed end (not label) and a first free end (not label) opposite to the first fixed end. The two first fixed ends are fixed to the first connector body 11 at opposite sides of the first receiving hole 111, and the two first free ends are free and overlappable to cover the first opening 112, thereby preventing contamination from contaminating the first lenses 14. In detail, the first fixed ends are respectively fixed to the first surface 114 and the second surface 115.

The male optical connector 30 includes a second connector body 31, a second hollow pusher 32, a second support platform 33, two second lenses 34, and two second shielding plates 35.

The second connector body 31 includes a second coupling surface 310 facing the first coupling surface 110. The second coupling surface 310 defines a second receiving hole 311 with a second opening 312. The second receiving hole 311 is rectangular and blind. The second connector body 31 includes a connection surface 313, a first side surface 314, and a second side surface 315 in the second receiving hole 311. The first side surface 314 is substantially parallel to the second side surface 315. The connection surface 313 perpendicularly interconnects the first side surface 314 and the second side surface 315.

The second support platform 33 is a cube and extends from the connection surface 313. The second support platform 33 is aligned with the first support platform 12 and includes a second light receiving surface 330 at a distal portion thereof. The second light receiving surface 330 faces the first light receiving surface 120 and is substantially parallel to the connection surface 313.

The second hollow pusher 32 is a rectangular frame and extends from the second coupling surface 310. The second hollow pusher 32 includes an upper wall 322 and a lower wall 324 substantially parallel to the lower wall 324. The second hollow pusher 32 surrounds the second receiving hole 311. The upper wall 322 is coplanar with the first side surface 314. The lower wall 324 is coplanar with the second side surface 315.

The second lenses 34 are received in the second hollow pusher 32 and partially arranged on the second light receiving surface 330. The second lenses 34 are aligned with the respective first lenses 14.

The second shielding plates 35 are made of elastic material, such as plastic, rubber, and metal sheet. Each second shielding plate 35 includes a second fixed end (not label) and a second free end (not label) opposite to the second fixed end. The two second fixed ends are fixed to opposite sides of the second hollow pusher 32, and the two second free ends are free and overlappable to cover the second opening 312, thereby preventing contamination from contaminating the second lenses 34. In detail, the second fixed ends are respectively fixed to the upper wall 322 and the lower wall 324.

Figure 5:
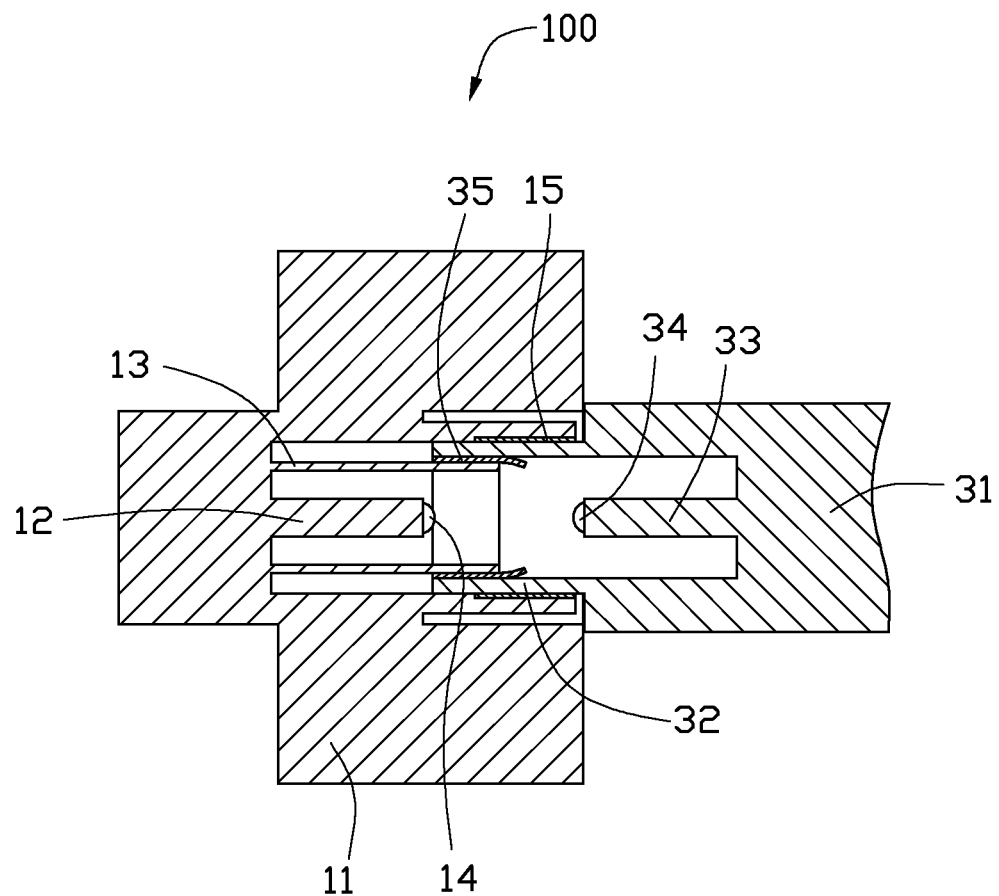
FIG. 5 is similar to FIG. 4, but showing the optical fiber coupling assembly in a coupled stated.

Referring to FIGS. 4-5, when the male optical connector 30 is inserted into the female optical connector 10, the second hollow pusher 32 pulls the first shielding plates 15 to bend toward the bottom surface 113. When the male optical connector 30 is further inserted into the female optical connector 10, the first hollow pusher 13 pulls the second shielding plates 35 to bend toward the connection surface 313 until the first lenses 14 are exposed to the second lenses 34. In this situation, the second hollow pusher 32 is received in the receiving room 118. The first coupling surface 110 abuts the second coupling surface 310. The second hollow pusher 32 presses the first shielding plates 15 in the recesses 116. The second shielding plates 35 are pressed between the first hollow pusher 13 and the second hollow pusher 32. In detail, one of the second shielding plates 35 is positioned between the top wall 132 and upper wall 332, and the other one is positioned between the bottom wall 134 and the lower wall 334. Therefore, the first shielding plates 15 and the second shielding plates 35 are open. In other words, the light path between the first lenses 14 and the second lenses 34 is clear. As a result, the first lens 14 is optically coupled with a corresponding second lens 34.

The female optical connector 10 further includes a number of first optical fibers (not shown), such as first transmitting optical fibers and first receiving optical fibers, inserted into the first support platform 12 and optically coupled to the first lenses 14. The male optical connector 60 further includes a number of second optical fibers (not shown), such as second transmitting optical fibers and second receiving optical fibers, inserted into the second support platform 33 and optically coupled to the second lenses 34. Each second receiving optical fiber is coupled to a corresponding first transmitting optical fiber through the first lens 14 and the second lens 34. Each first receiving optical fiber is coupled to a corresponding second transmitting optical fiber (not shown) through the first lens 14 and the second lens 34. Therefore, optical transmittance can begin and is not influenced by the first shielding plates 15 and the second shielding plates 35.

When the male optical connector 30 is detached from the female optical connector 10, the first shielding plates 15 rotate to cover the first opening 112 as the restoration of the first shielding plates 15, and the second shielding plates 35 rotate to cover the second opening 312 as the restoration of the second shielding plates 35.

In other embodiments, the first hollow pusher 13 may be a hollow cylinder, and the second hollow pusher 32 may be a hollow cylinder. When the male optical connector 30 is coupled with the female connector 10, the second shielding plates 35 are pressed between the circumference wall of the first hollow pusher 13 and the circumference wall of the second hollow pusher 32.

Even though numerous characteristics and advantages of the present embodiments have been set fourth in the foregoing description, together with details of the structures and functions of the embodiments, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. An optical fiber coupling assembly comprising:
  a female optical connector comprising:
    a first connector body comprising a first coupling surface, the first coupling surface defining a first receiving hole with a first opening, the first connector body further comprising a bottom surface, a first surface, and a second surface in the first receiving hole, the bottom surface facing the first opening and perpendicularly interconnected between the first surface and the second surface;
    a first hollow pusher extending from the bottom surface and received in the first receiving hole, the first hollow pusher being spaced apart from the first surface and the second surface;
    first optical fibers;
    first lenses received in the first receiving hole and optically coupled to the first optical fibers; and
    two elastic first shielding plates having first fixed ends fixed to the first surface and the second surface at opposite sides of the first receiving hole, and opposite first free ends overlappable to cover the first opening; and
  a male optical connector comprising:
    a second connector body defining a second receiving hole with a second opening, the second connector body comprising a connection surface in the second receiving hole, the connection surface facing the second opening;
    a second hollow pusher extending from the second connector body and surrounding the second receiving hole;
    second optical fibers;
    second lenses received in the second receiving hole and optically coupled to the second optical fibers; and
    two elastic second shielding plates having second fixed ends fixed to opposite sides of the second hollow pusher, and opposite second free ends overlappable to cover the second opening;
  wherein the male optical connector is inserted in the female optical connector, the first shielding plates are bent inwardly toward the bottom surface by the second hollow pusher, and the second shielding plates are bent inwardly toward the connection surface by the first hollow pusher so as to expose the first lenses to the second lenses.

2. The optical fiber coupling assembly in claim 1, wherein the female optical connector further comprises a first support platform with the first optical fibers inserted thereinto, the first support platform extends from the bottom surface and received in the first hollow pusher, the first support platform has a first light receiving surface facing toward the first opening, and the first lenses are formed on the first light receiving surface.

3. The optical fiber coupling assembly in claim 2, wherein the male optical connector further comprises a second support platform with the second optical fibers inserted thereinto, the second support platform extends from the connection surface and received in the second hollow pusher, the second support platform has a second light receiving surface facing toward the second opening, and the second lenses are formed on the second light receiving surface.

4. The optical fiber coupling assembly in claim 1, wherein the first surface is substantially parallel to the second surface, two recesses are respectively defined in the first surface and the second surface for receiving the first shielding plates, and the recesses are positioned at a distal portion of the first receiving hole away from the bottom surface.

5. The optical fiber coupling assembly in claim 4, wherein the first hollow pusher is a rectangular frame and comprises a top wall and a bottom wall, the top wall is adjacent to the first surface, the bottom wall is substantially parallel to the top wall and is adjacent to the second surface, a receiving room is formed between the first hollow pusher and the first and second surfaces, and the second hollow pusher is received in the receiving room.

6. The optical fiber coupling assembly in claim 1, wherein the first hollow pusher is a cylinder.

7. The optical fiber coupling assembly in claim 1, wherein the second hollow pusher is a rectangular frame and comprises an upper wall and a lower wall parallel to the upper wall, and the second fixed ends of the second shielding plates are fixed to the upper wall and the lower wall respectively.

8. The optical fiber coupling assembly in claim 7, wherein the second connector body comprises a first side surface and a second side surface in the second receiving hole, the first side surface is parallel to the second side surface, the connection surface connects the first side surface to the second side surface, the upper wall is coplanar with the first side surface, and the lower wall is coplanar with the second side surface.

9. The optical fiber coupling assembly in claim 8, wherein the second connector body further comprises a second coupling surface, the second receiving hole is defined in the second coupling surface, and the second hollow pusher extends from the second coupling surface.

10. The optical fiber coupling assembly in claim 1, wherein the second hollow pusher is a cylinder.

* * * * *